United States Patent [19]

Frostick

[11] Patent Number: 5,114,573

[45] Date of Patent: * May 19, 1992

[54] APPARATUS FOR DEPOSITING A VISCOUS VALVE OPENER MATERIAL WITHIN AN ENGINE OIL FILTER

[75] Inventor: Lewis A. Frostick, Peck, Mich.

[73] Assignee: Saturn Corporation, Troy, Mich.

[*] Notice: The portion of the term of this patent subsequent to Mar. 5, 2008 has been disclaimed.

[21] Appl. No.: 528,402

[22] Filed: May 25, 1990

Related U.S. Application Data

[60] Division of Ser. No. 401,720, Sep. 1, 1989, Pat. No. 4,997,554, which is a continuation-in-part of Ser. No. 322,856, Mar. 14, 1989, abandoned.

[51] Int. Cl.$^5$ .................. B01D 27/10; F01M 7/00
[52] U.S. Cl. ..................... 210/136; 210/232; 210/251; 401/10; 29/890.12
[58] Field of Search .......... 210/251, 542, 136, 149, 210/232, 435, 444, DIG. 17; 401/9, 10; 141/20.5, 21-27; 137/67, 72-74; 29/163.8, 527.1, 530, 890.124, 890.126, 890.127

[56] References Cited

U.S. PATENT DOCUMENTS

| | | | |
|---|---|---|---|
| 3,065,630 | 11/1962 | Jensen | 73/40 |
| 3,984,318 | 10/1976 | Bumb | 210/130 |
| 4,433,656 | 2/1984 | Norwood, Sr. | 123/196 A |
| 4,712,589 | 12/1987 | DeGaspari | 141/25 |
| 4,997,554 | 3/1991 | Frostick | 210/251 |

Primary Examiner—W. Gary Jones
Assistant Examiner—Matthew O. Savage
Attorney, Agent, or Firm—Ronald L. Phillips

[57] ABSTRACT

An apparatus for depositing a viscous valve opener material within an engine oil filter is disclosed herein. The engine oil filter includes an anti-drain back valve that is normally closed on a seat, the seat having inlet passages therethrough for oil passage into the filter. The apparatus includes a base and a plurality of injectors extending from the base arranged so as to be insertable into the inlet passages of the oil filter. The injectors are sized to lift the valve off the seat thereby forming a space between the valve and seat. The injectors include openings facing the space between the valve and seat for depositing the temporary viscous valve opener material into the space.

3 Claims, 2 Drawing Sheets

APPARATUS FOR DEPOSITING A VISCOUS VALVE OPENER MATERIAL WITHIN AN ENGINE OIL FILTER

This is a divisional of Ser. No. 07/401,720, filed Sep. 1, 1989, now U.S. Pat. No. 4,997,554, which was a continuation-in-part of Ser. No. 07/322,856, filed Mar. 14, 1989, now abandoned.

TECHNICAL FIELD

This invention relates to engine oil filter assemblies and, more particularly, to the initial filling of the lubrication system in a newly assembled internal combustion engine wherein there is employed an oil filter with an anti-drainback valve.

BACKGROUND OF THE INVENTION

In a newly assembled internal combustion engine wherein there is employed an oil filter with an anti-drainback valve, the latter can in some installations block filling or priming of the lubrication system between the engine oil pump and the filter and between the filter and the main oil gallery and, in particular, the hydraulic tappets. As a result, on initial engine startup and without full priming or filling, there can result discernible noise until the hydraulic tappets are filled or pumped up. For this reason, it has previously been proposed to provide a special fill connection between the pump and filter and also between the filter and the hydraulic tappets and also to pre-charge the filter prior to its assembly. The former provisions require additional space and cost, and the latter provision requires a separate filling operation and is prone to spillage, particularly where the filter as installed has its example, where the filter is mounted horizontally, it is prone to spill from the filter if pre-charging is attempted prior to assembling the filter on the engine. Furthermore, these manners of filling are to be distinguished from the far more costly pre-start engine lubrication systems that charge an engine's lubrication system prior to every start or on a selective basis.

SUMMARY OF PRESENT INVENTION

The present invention is in a passive system that provides for efficient filling or priming of the engine's lubrication system without special access or fittings and without having to pre-charge the filter with oil. This is very simply accomplished with the provision of a temporary anti-drainback valve opener that is inserted during the assembly of the oil filter and operates to hold the anti-drainback valve open during initial filling of the engine's lubrication system so that oil during the filling process may freely flow through the filter to completely fill the system. The temporary valve opener is formed of a material that normally exists in a solid form but on contact with the engine oil and/or being elevated in temperature dissipates into the oil to allow the anti-drainback valve to thereafter operate as normal to prevent oil from draining back to the oil sump during engine shutdown. Preferably, the temporary anti-drainback valve opener is formed of a material that melts on contact with oil and also melts on heating within the range of normal engine operating temperature. Moreover, the material selected is preferably of a type that is currently commercially available, rather than having to be especially formulated.

It is thus an object of the present invention to provide an engine oil filter having an anti-drainback valve that is temporarily held open to facilitate priming of an engine lubrication system.

Another object is to provide an engine oil filter assembly having an anti-drainback valve that is held open during initial filling of an engine's lubrication system and then passively closes to thereafter provide normal anti-drainback valve operation during engine shutdown.

Another object is to provide a new and improved engine oil filter assembly having an anti-drainback valve that is temporarily held open by a material that melts at an elevated temperature and/or melts on contact with engine oil to condition the valve for its normal operation following initial filling of the engine's lubrication system through the filter.

These and other objects, advantages and features of the present invention will become more apparent from the following description and drawings in which:

BRIEF DESCRIPTION OF THE DRAWINGS

Referring to FIG. 1, there is shown an internal combustion engine lubrication system 10 having an oil pan or sump 12 from which lubricating oil is drawn by a pump 14 and passed through an oil filter assembly 16 prior to delivery to an oil distribution network 18 connected to supply the various parts of the engine requiring lubrication, i.e., crankshaft, hydraulic tappets, bearings, etc. The oil filter 16 in FIG. 1 is of a conventional design and comprises a canister 19 which is closed by an end-plate 20 and houses an annular filter element 22 that is arranged between a plurality of inlets 24 (only one of which is shown) and a central outlet 26 that is adapted by the threads there shown to be connected to the distribution network 18. Both the inlets 24 and threaded outlet 26 are formed in the plate 20 with the outlet located centrally thereof and the inlets located radially outward of and angularly about the inlet. Between the inlets 24 and the filter element 22, there is provided an elastomeric anti-drainback valve 28 that normally closes the inlets 24 as assembled and thus when the engine is shut down, but on the development of oil pressure by the pump 14 opens to permit oil to pass therethrough. Thereafter, when the engine is subsequently shut down, the anti-drainback valve 26 then normally closes to prevent oil in the filter and upstream thereof from draining back into the engine's sump.

Figure 1:
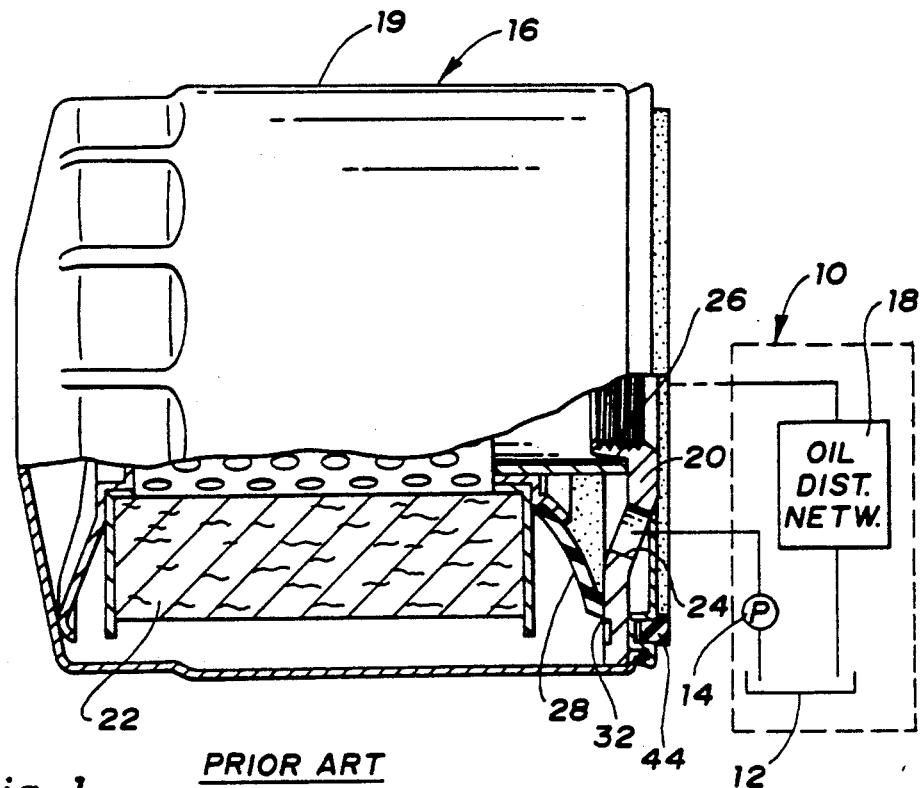
FIG. 1 is a partial longitudinal sectional view of a conventional oil filter assembly along with a diagrammatic view of an internal combustion engine lubrication system in which same is connected.
Figure 2:
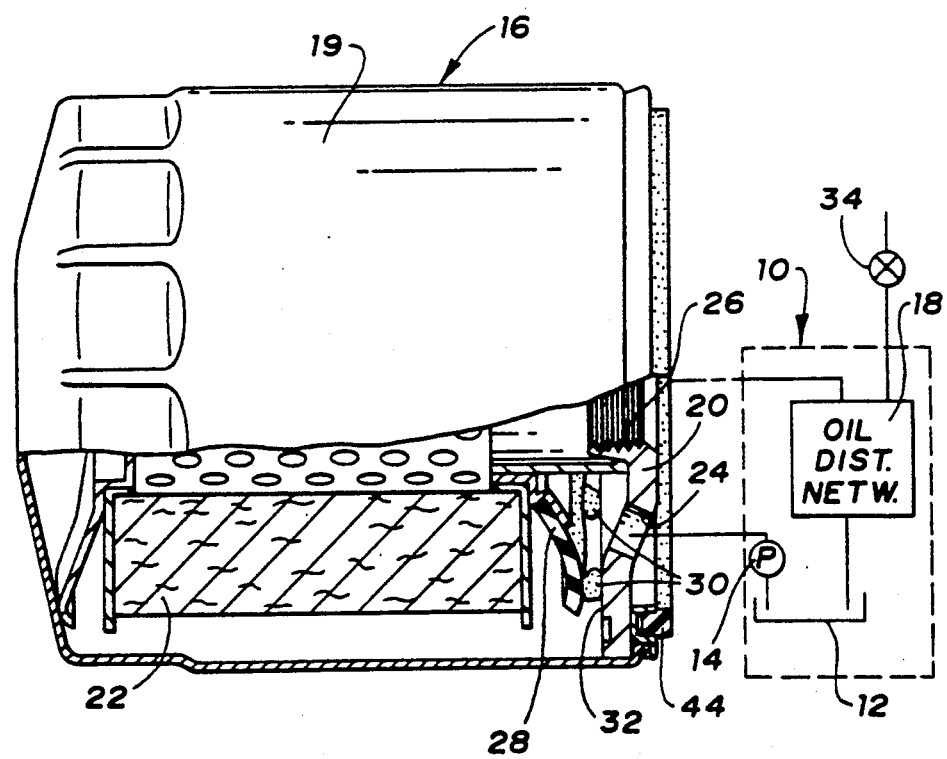
FIG. 2 is a view similar to FIG. 1 but showing the addition of the temporary anti-drainback valve opener according to the present invention.

According to the present invention, a quantity of special grease 30 is deposited in the filter 16 prior to its assembly on the engine, such deposit being in the form of one or more beads injected or otherwise placed between the conventional anti-drainback valve 28 and its valve seat 32 on the closure plate 20 as shown in FIG. 2. Such deposit is made through one or more of the inlets 24 at one or more places along the anti-drainback valve. The material is preferably that identified as "SLIP COAT" grease "C2#2412" manufactured by Keystone Division of Penwalt Corporation and normally used for launching ships and off-shore drill rigs on sliding ways. This material was discovered to have the characteristics of (a) being firm enough at ambient filter and vehicle assembly temperatures exceeding 100° F. to hold the anti-drainback valve 28 open against its inherent elastic closing force but then to melt and allow the valve to close at a temperature of about 234° F. which falls within the range of normal engine operating temperatures of 230°-250° F., and (b) melting upon contact with the oil over a period of time to assure eventual valve closing over a limited time regardless of the engine reaching its normal operating temperature. For example, such melting of this material was found to completely occur within 2.25 hours maximum. Moreover, the preferred material has the characteristic of being compatible with the oil such as not to affect the lubricating qualities of the latter nor to result in adverse deposits on the bearing surfaces and other surfaces internal of the engine.

Thus with the temporary anti-drainback valve opener 30 applied as shown in FIG. 2 and on assembly of the oil filter on the engine, the engine's oil lubrication system may then be filled through a simple tap 34 in its main oil gallery 18 and preferably under pressure and flow through the normal outlet 26 of the filter to fill the latter and thereafter flow past the anti-drainback valve to charge the discharge side of the pump. In the particular engine for which the subject filter is adapted, the oil filter itself requires only ⅛ of a pint of oil for filling and the entire main oil gallery including the hydraulic tappets require only a total of 1½ pints, and thus the engine's oil lubrication system may be very rapidly and assuredly filled.

With the preferred temporary valve opener 30 in place and the engine lubrication system initially and thus fully primed, the opener 30 immediately starts to dissipate into the oil by contact therewith and this dissipation by oil contact may go to completion even prior to the initial engine start up, for example, where first engine start up following the initial oil fill does not occur until after the maximum oil contact melt time. Alternatively, should the engine be started immediately after charging with oil, the melting with applied heat characteristic of the material then operates to effect the complete dissipation when the engine oil reaches its normal operating temperature. Moreover, it will be appreciated that the material may also be only responsive to melting on temperature buildup in which case a simple oil compatible paraffin or wax material might be used.

Figure 3:
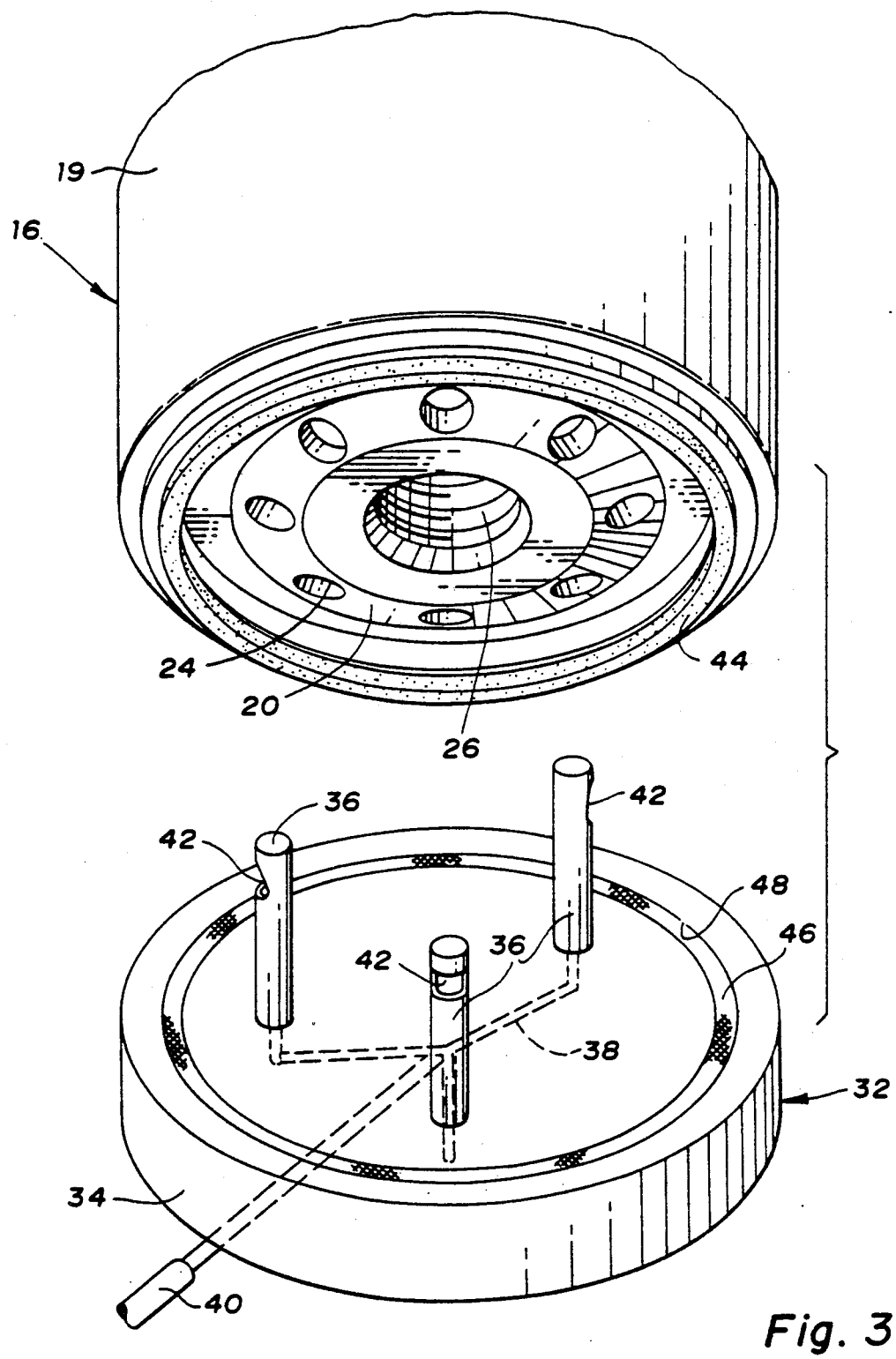
FIG. 3 is an isometric view showing the filter in FIG. 1 poised over the preferred form of apparatus for depositing the valve opener in FIG. 2.

Referring to FIG. 3, there is shown apparatus generally designated as 32 for depositing the viscous valve opener 30 on a filter assembly line in an accurate, cost effective, rapid manner. The apparatus comprises a horizontal, cylindrical plate 34 having three (3) vertical tubular injectors 36 mounted in parallel relationship on the top of the plate and connected therethrough by an internal passage network 38 and thence by a hose 40 to a pressurized container containing the opener material (not shown). The injectors 36 are closed at their upper end and are angularly spaced at equal radial distances from the plate center so as to align with any three of the oil filter inlets 24 and push the valve 28 off its seat 32 when the filter is inserted on the injectors face down on the plate 34. The injectors 36 each have a radially outwardly opening outlet port 42 located axially along the injector so as to be opposite the resulting space between the thus lifted valve 28 and its seat 32. The filter has the normal O-ring seal 44 for sealing with the engine on assembly thereto and this seal is dampened for such eventual assembly by a cloth type rope/oil soaked pad 46 mounted in a circular upwardly facing groove 48 in the upper face of the plate 34 and centered therewith at a radial location corresponding to the filter seal.

On the assembly line an oil filter is placed over the three injectors 36 and indexed to align three of the inlets 24 therewith and then pushed down onto the plate 34 with the oil seal down, thereby lifting the valve 28 off its seat 32 with the tops of the injectors 36. With engagement of the filter with the plate 34, the oil ring 46 is thereupon dampened with a thin film of oil by the oil pad 46 while opener material 30 is pumped through the injector ports 42 into three angular spaced locations to hold the valve 28 unseated on removal of the filter from this apparatus.

Thus the foregoing description of the preferred embodiment of the invention has been presented for purposes of illustration and description. It is not intended to be exhaustive or to limit the invention to the precise form disclosed. Obvious modifications and variations are possible in light of the above teaching. The preferred embodiment was chosen and described to provide the best illustration of the principles of the invention and its practical application to thereby enable one of ordinary skill in the art to utilize the invention and with various modifications as are suited to the particular use contemplated. All such modifications and variations are within the scope of the invention as determined by the appended claims when interpreted in accordance with the breadth to which they are fairly, legally and equitably entitled.

The embodiments of the invention in which an exclusive property or privilege is claimed are defined as follows:

1. In combination, an oil filter assembly for an internal combustion engine, said oil filter assembly comprising a valve seat having a plurality of inlets therethrough for admitting a lubricating oil into the oil filter assembly, an outlet, a filter element located between said inlets and outlet, and an anti-drainback valve located between said filter element and said inlets and normally closed against said valve seat to prevent oil from draining out said inlets, apparatus for depositing a viscous material as a temporary valve opener between said anti-drainback valve and said seat, said apparatus comprising a base, a plurality of injectors extending in parallel relationship from the base and angularly and radially spaced about a center point so as to align with a corresponding number of said inlets and be insertable therethrough, said injectors having a length determined to engage and lift said valve off its seat leaving a space therebetween when said filter is forced against said base with said injectors extending through said inlets, said injectors each having an outlet port located axially therealong and facing in a radial direction so as to be opposite the space between said valve and said seat, and a source of temporary valve opener material connected to said injectors.

2. The combination set forth in claim 1 wherein there are three and only three of said injectors.

3. The combination set forth in claim 1 wherein said material is a petroleum lubricating grease that is compatible with the lubricating oil and normally exists in a form firm enough to initially hold said valve off said valve seat but dissipates on contact with the oil and also melts on initial engine startup when the lubricating oil reaches a predetermined temperature, whichever dissipation or melting occurs first, thereby allowing the valve to thereafter operate in its normal manner with said valve seat.

* * * * *